Patented Jan. 12, 1937

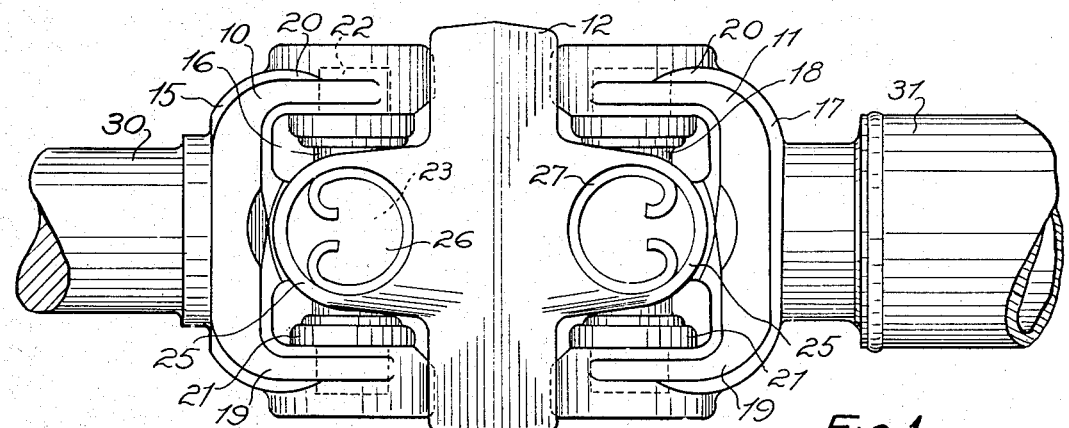

2,067,286

UNITED STATES PATENT OFFICE 2,067,286

DOUBLE UNIVERSAL JOINT

John W. B. Pearce, Toledo, Ohio

Application May 4, 1935, Serial No. 19,857

16 Claims. (Cl. 64—21)

This invention relates to universal joint structures, and more particularly to an improved form of double universal joint which is of economical construction and very durable and efficient in operation.

An object of the present invention is to provide an improved universal joint structure comprising connected universal joint assemblies and embodying novel means for centering or relatively positioning corresponding members of the joint assemblies.

Another object of this invention is to provide an improved double universal joint wherein novel means is provided for enclosing and lubricating the centering means.

Still another object of this invention is to provide an improved double universal joint having centering means comprising members extending from the respective joints and having a universal movement connection therebetween, and wherein a shell enclosing the universal connection has sealing and pivotal supporting engagement with the members on opposite sides of the universal connection.

A further object of the invention is to provide an improved double universal joint having centering means including a ball and socket connection, and wherein the bearing surface of the socket is formed with the center of curvature thereof to lie substantially in the transverse midplane of the joint structure during operation thereof with angularity corresponding substantially with a normal operating position.

Other objects and advantages of this invention will be apparent from the following description when taken in conjunction with the accompanying sheet of drawings, wherein Fig. 1 is a side elevation of a double universal joint embodying my invention.

Fig. 2 is a similar view of the device with parts thereof in section.

Fig. 3 is a longitudinal sectional view of the device with joint members thereof deflected to an angular position representing a normal operating condition of the device, and Fig. 4 is a transverse sectional view taken on line 4—4 of Fig. 2.

Detailed reference will now be made to the accompanying drawing wherein I have illustrated an improved double universal joint which may be used for various purposes, but which is especially suitable for use in transmitting torque in motor vehicles. While the drawing shows what I now regard to be a preferred form of my improved universal joint, it will be understood, of course, that they are illustrative only, and that the invention may be embodied in various other structural arrangements.

My improved double universal joint comprises, in general, a pair of universal joint assemblies 10 and 11 which are operably connected by an intermediate torque transmitting member 12, and a centering connection or device 13 between the joint assemblies for centering or relatively positioning corresponding members of the assemblies with respect to each other. As will be explained more fully hereinafter, the centering device cooperates with corresponding members of the two joint assemblies and causes these members to always assume the same angular position with respect to an oscillation center when a flexing of the universal joint structure takes place.

The universal joint assembly 10 may comprise a yoke 15 and a cross 16. The universal joint assembly 11 may comprise similar yoke and cross members 17 and 18. Each of these yokes has spaced arms 19 and 20 carrying suitable bearings 21. Each cross is provided with oppositely extending pairs of trunnions 22 and 23 all of which lie in the same plane. The trunnions 22 are disposed at right angles to the trunnions 23 and extend into the bearings 21 of the spaced yoke arms 19 and 20.

The intermediate connecting member 12 may be constructed as a ring having pairs of ears 25 extending in opposite directions axially of the structure. Suitable bearings 26 are provided in the ears 25 and receive the oppositely extending trunnions 23 of the crosses 16 and 18. The bearings 21 of the yoke arms and the bearings 26 of the connecting member may be of any suitable character, and may be retained in place by any suitable means, such as the spring rings 27 which engage in grooves 28 outwardly of the bearings.

The yoke 15 of the joint assembly 10 may be provided with a sleeve or shaft extension 30 for connection with a power shaft such as a shaft of a motor vehicle transmission. The yoke 17 of the joint assembly 11 may also be provided with a sleeve or shaft extension 31 for connection with a power shaft, such as a propeller shaft or axle shaft of a motor vehicle.

The centering device 13 comprises members which extend toward each other from the respective joint assemblies 10 and 11, and which have cooperating parts providing a connection therebetween adapted for universal movement. In this instance these members are in the form of pin-like or stem-like members 34 and 35 which are seated respectively in openings 36 and 37 of the yoke members 15 and 17. The crosses 16 and 18 are provided, respectively, with tapered openings 39 and 40' which accommodate the members 34 and 35.

One of the pins of the centering device, in this instance the pin 35, is provided on its projecting end with a socket part 40. The pin 34 is provided on its projecting end with a stem part 41 which extends into the recess of the socket part 40. A bearing 42 in the form of a ball is rockably seated in the recess of the socket part 40 and is longitudinally slidable on the stem part 41.

The ball 42 is constructed of suitable bearing material and may be formed of complemental sections 43 and 44. As shown in the drawing, the wall of the socket part 40 is a unitary structure which is extended so that the curved inner surface of this part is of greater extent than a hemisphere. The complemental parts 43 and 44 of the ball 42 are normally held in relatively expanded relation by the stem 41 and, since the wall of the socket part provides a bearing surface which is greater than a hemisphere, it will be seen that the ball cannot be withdrawn from the socket recess. It will be understood, of course, that the sections 43 and 44 of the ball 42 can be inserted or removed from the socket recess when the stem 41 is not in place.

As an important feature of my invention, I construct the socket part 40 so that the center of curvature 45 for the inner bearing surface of the socket recess is off-set longitudinally with respect to the transverse mid-plane 46 of the joint structure when the universal joint assemblies are in straight line condition, as shown in Figs. 1 and 2. The center of curvature 45 is so located that when the joint members 15 and 17 of the assemblies 10 and 11 are in an angular position corresponding with a normal working condition, as shown in Fig. 3 of the drawing, it will lie substantially in the transverse mid-plane 46 during rotation of the joint. By forming the ball and socket members of the centering device with the center of curvature thereof located with respect to the transverse mid-plane, as just explained, it will be seen that the majority of the relative rocking movements between the ball and socket parts will occur while the center of curvature lies in or close to the transverse mid-plane. This condition is highly desirable from the standpoint of balance and wear, and increases the efficiency and smoothness of operation of the joint structure.

To exclude dust and other foreign matter from the centering device 13, and to retain lubricant in the vicinity of the cooperating parts of the centering device, I provide the latter with an enclosure 48. According to my invention, this enclosure surrounds the ball and socket connection or swivel of the centering device and has sealing and pivotal supporting engagement with the extending pins 34 and 35.

The enclosure 48 may comprise a tubular sheet metal shell formed by telescoping complemental sections 49 and 50. The pin 34 may be provided with a ball enlargement 51 at one side of the universal connection formed by the ball and socket parts, and the pin 35 may have a similar ball enlargement 52 at the other side of the universal connection. The shell section 49 is provided with a reduced end portion 53 which has sealing and relative rocking engagement with the ball enlargement 51. Likewise, the reduced end 54 of the shell section 50 has sealing and relative rocking engagement with the ball enlargement 52.

The reduced ends 53 and 54 of the enclosure shell may be provided, respectively, with suitable packings 56 and 57 which are retained in place by a cup-like washer 58 mounted in the reduced end portions. The washer 58 may, if desired, have a flange 59 shaped for bearing cooperation with the surface of the ball enlargements 51 and 52. It will be seen from the construction and arrangement of the enclosure 48, as just explained, the enclosure is supported within the intermediate ring member 12 by the pins 34 and 35. Since the centers of the ball enlargements 51 and 52 are off-set toward each other from the transverse planes of the crosses 16 and 18, it will be seen that during operation of the joint structure with angularity of the members 15 and 17, the enclosure will move transversely within the opening of the ring member 12, and the ball and socket connection of the centering device will move transversely within the enclosure.

For supplying lubricant to the cooperating ball and socket parts of the centering device, I provide a lubricant supply passage 60 in the pin 35 and a lubricant supply fitting 61 on the joint member 17 in communication with the passage. Lubricant may be forced through the fitting 61 and the passage 60 to the space provided by the undercut 62 of the socket part 40. To facilitate the lubricating of the ball and socket connection I provide a relief passage 63 in the pin 34. This relief passage communicates at one end with the undercut 62 and at its other end communicates with atmosphere preferably through a groove 64 formed in the outer surface of the pin. The passage 63 permits the escape of air from the space 62 as lubricant is forced thereinto and also serves as a reservoir for supplying additional lubricant to the ball and socket parts. When the centering device is being lubricated, the appearance of lubricant at the outer end of the vent passage 64 will indicate to the operator that the centering device has received lubricant.

From the foregoing description and the accompanying drawing, it should now be understood that I have provided an improved double universal joint structure which is very reliable and efficient. It should be understood further that I have provided a novel centering means for a double universal joint and improved means for sealing and lubricating the centering means.

While I have illustrated and described the improved universal joint structure of my invention in a detailed manner, it should be understood, however, that I do not wish to be limited to the precise details of construction and arrangements of parts illustrated and described, but regard the invention as including such changes and modifications as do not constitute a departure from the spirit of the invention and the scope of the appended claims.

Having thus described my invention, I claim:

1. In a joint of the character described the combination of a pair of connected universal joints, centering means for said joints comprising cooperating members one having a socket and the other having a stem extending into the socket, and a sectional ball rockably seated in the socket and slidable on said stem.

2. In a joint of the character described the combinaton of a pair of connected universal joints, centering means for said joints comprising cooperating members one having a socket and the other having a stem extending into the socket, and a ball rockably seated in said socket and slidable on said stem, said socket having the wall thereof integrally extended to retain the ball therein.

3. In a joint of the character described the combination of a pair of connected universal joints, centering means for said joints comprising cooperating members one having a socket and the other having a stem extending into the socket, and a ball rockably seated in said socket and slidable on said stem, said socket having a unitary wall provided with a curved inner surface of greater extent than a hemisphere whereby said ball is retained therein.

4. In a joint of the character described the combination of a pair of connected universal joints, centering means for said joints comprising cooperating members one having a socket and the other having a stem extending into the socket, and a ball rockably seated in said socket and slidable on said stem, said ball being formed of complemental sections which are relatively expanded in said socket by said stem.

5. In a joint of the character described the combination of a pair of connected universal joints, centering means for said joints comprising cooperating members one having a socket and the other having a stem extending into the socket, and a ball rockably seated in said socket and slidable on said stem, said socket having a unitary wall provided with a curved inner surface of greater extent than a hemisphere and said ball being formed of complemental sections which are relatively expanded in said socket by said stem.

6. In a joint of the character described the combination of a pair of connected universal joints, centering means for said joints comprising cooperating members one having a socket and the other having a ball engaging in said socket, the bearing surface of said socket being formed with the center of curvature thereof off-set longitudinally with respect to the transverse mid-plane of the joint when said universal joints are in substantially straight line position.

7. In a joint of the character described the combination of a pair of connected universal joints, and centering means for said joints comprising cooperating members one having a socket and the other having a ball engaging in said socket, the socket bearing surface and said ball having a common center of curvature which lies substantially in the transverse mid-plane of the joint during operation thereof with angularity corresponding substantially to a normal operating position for the joints.

8. In a joint of the character described the combination of a pair of connected universal joints, centering means for said joints comprising cooperating ball and socket members, and a sealing device enclosing said ball and socket members and extending in opposite directions therefrom axially of the joint, said sealing device being movable transversely of the joint with said centering means and having its ends connected with the centering means at opposite sides of the ball and socket members.

9. In a joint of the character described the combination of a pair of connected universal joints, centering means for said joints comprising members having stem portions extending toward each other from the respective joints and provided at their adjacent ends with cooperating parts forming a swivel therebetween, and a sealing shell enclosing said swivel and supported on said stem portions at opposite sides of the swivel and at points spaced therefrom axially of the joint.

10. In a joint of the character described the combination of a pair of connected universal joints, centering means for said joints comprising members having stem portions extending toward each other from the respective joints and provided at their adjacent ends with cooperating parts forming a swivel therebetween, a shell enclosing said swivel and having sealing and supporting engagement with said stem portions on opposite sides of the swivel and at points spaced therefrom axially of the joint, and means for supplying lubricant to the swivel.

11. In a joint of the character described the combination of a pair of connected universal joints, centering means for said joints comprising members extending toward each other from the respective joints and having a swivel therebetween, a seal disposed around said swivel, and means providing pivotal connections betwen said seal and said members on opposite sides of said swivel.

12. In a joint of the character described the combination of a pair of connected universal joints, centering means for said joints comprising members extending toward each other from the respective joints and having a universal connection therebetween, a tubular shell disposed around said universal connection, and means providing combined sealing and universal movement connections between the shell and said members on opposite sides of said universal connection.

13. In a joint of the character described the combination of a pair of connected universal joints, centering means for said joints comprising members extending toward each other from the respective joints and having a swivel therebetween, ball enlargements on said members on opposite sides of said swivel, and a shell disposed around said swivel and supported on said ball enlargements.

14. In a joint of the character described the combination of a pair of connected universal joints, centering means for said joints comprising members extending toward each other from the respective joints and having a universal connection therebetween, a tubular shell disposed around said universal connection, means providing combined sealing and universal movement connections between the shell and said members on opposite sides of said universal connection, and means for supplying lubricant to said universal connection.

15. In a joint of the character described the combination of a plurality of pairs of swivelly connected members, an intermediate hollow member having operative pivotal connection with corresponding members of said pairs, a shell in said hollow member, and a centering device comprising members extending into said shell from other corresponding members of said pairs and having a universal connection therebetween, said shell being transversely movable in said hollow member and said universal connection being transversely movable in and relative to said shell.

16. In a universal joint, the combination of a plurality of pairs of swivelly-connected members, an intermediate yoke having operative pivotal connections with corresponding members of said pairs, other corresponding members of said pairs carrying portions extending inwardly of the joint, one of said portions carrying a socket element and the other of said portions carrying a ball element having a part-spherical engagement with the interior of said socket element, one of said elements being slidable with respect to its associated portion and the center of said ball-and-socket elements being offset from the center of said intermediate yoke when there is no angularity in the joint.

JOHN W. B. PEARCE.